United States Patent
Praharaj et al.

(10) Patent No.: US 11,958,297 B2
(45) Date of Patent: Apr. 16, 2024

(54) GRAININESS MITIGATION USING SEPARATE PRINTING PASSES FOR DISTORTABLE COLORS

(71) Applicant: Xerox Corporation, Norwalk, CT (US)

(72) Inventors: Seemit Praharaj, Webster, NY (US); Douglas K. Herrmann, Webster, NY (US)

(73) Assignee: Xerox Corporation, Norwalk, CT (US)

(*) Notice: Subject to any disclaimer, the term of this patent is extended or adjusted under 35 U.S.C. 154(b) by 317 days.

(21) Appl. No.: 17/488,446

(22) Filed: Sep. 29, 2021

(65) Prior Publication Data
US 2023/0095768 A1    Mar. 30, 2023

(51) Int. Cl.
*B41J 2/21* (2006.01)
*G06F 3/12* (2006.01)
*G06K 15/10* (2006.01)

(52) U.S. Cl.
CPC .......... *B41J 2/2103* (2013.01); *G06F 3/1208* (2013.01); *G06F 3/1256* (2013.01); *G06K 15/105* (2013.01)

(58) Field of Classification Search
CPC .... B41J 2/2103; G06F 3/1208; G06F 3/1256; G06K 15/105
See application file for complete search history.

(56) References Cited

U.S. PATENT DOCUMENTS

| | | | |
|---|---|---|---|
| 7,661,808 B2 | 2/2010 | Nakajima | |
| 8,454,152 B2 | 6/2013 | Kobayashi et al. | |
| 8,783,811 B2 | 7/2014 | Nitta et al. | |
| 8,936,340 B2 * | 1/2015 | Itogawa | B41J 11/0005 347/16 |
| 8,939,541 B2 * | 1/2015 | Walker | B41J 11/0021 347/19 |
| 9,460,375 B2 * | 10/2016 | Bayona | G06K 15/1868 |
| 9,463,649 B1 * | 10/2016 | Liu | B41J 11/0021 |
| 10,618,318 B2 | 4/2020 | Ohnishi | |
| 2013/0027489 A1 | 1/2013 | Suzuki et al. | |
| 2017/0087874 A1 | 3/2017 | Maida | |
| 2020/0384778 A1 | 12/2020 | Van Dorpe et al. | |

* cited by examiner

*Primary Examiner* — Sharon Polk
(74) *Attorney, Agent, or Firm* — Gibb IP Law Firm, LLC (57) ABSTRACT

Printing methods and devices identify distortable ink colors in a print job. These distortable ink colors interact with one another when printed in the same printing pass on the same area of a sheet. These methods and devices control printheads and sheet feeders to separately print the distortable ink colors in different print passes.

20 Claims, 8 Drawing Sheets

GRAININESS MITIGATION USING SEPARATE PRINTING PASSES FOR DISTORTABLE COLORS

BACKGROUND

Systems and methods herein generally relate to printing methods and systems and more particularly to such that provide graininess mitigation to improve image quality.

Image quality (IQ) creates the primary impression in printed products, especially in graphic, color prints. One of the drivers of image quality is graininess. Graininess (more specifically overlay graininess and multi-color graininess) remains a fundamental inkjet issue that cannot be comprehensively addressed using special types of inks or printheads. Because of the large effect that graininess has on image quality, it is imperative to address overlay graininess defects in a cost-effective manner, especially in the aqueous inkjet market.

SUMMARY

Methods herein identify distortable ink colors in a print job. The distortable ink colors are those that interact with one another when printed in the same printing pass on the same area of a sheet (e.g., by mixing irregularly when wet, etc.). More specifically, these processes evaluate the print job to identify locations in the print job where the distortable ink colors would print on the same area of the sheet in a single-pass printing process.

In order to address issues with distortable ink colors, such methods also control a printhead and sheet feeders of a printing apparatus to separately print the distortable ink colors in different print passes. While each printing pass can print a single color, some methods herein control the printhead and the sheet feeders to separately print sets of different ink colors in different print passes or to print at least two different ink colors in at least one of the printing passes.

These methods further control the sheet feeders and a dryer of the printing apparatus to dry the ink printed on the sheets of media between the different print passes. In such processing, methods herein can control the dryer to apply relatively more drying to sheets printed in a single pass and relatively less drying per pass to sheets printed in multiple passes.

Some embodiments herein can additionally control the printhead to print heat-activated alignment marks during or before the first pass of the multi-pass printing process. The heat-activated alignment marks become temporarily visible after being activated by the dryer. Thus, these methods can control the sheet feeders to align the sheets of media in the different print passes occurring after the first pass using the heat-activated alignment marks while the heat-activated alignment marks are still visible after activation of the heat-activated alignment marks by the dryer (when the dryer dries the sheets of media between the different print passes).

Systems herein perform such methods using a printhead (e.g., inkjet printhead), a dryer adapted to dry the ink printed on sheets of media by the printhead, sheet feeders adapted to move the sheets of media to and from the printhead and the dryer, a controller adapted to control the printhead, the dryer, and the sheet feeders, and other components. The controller is adapted to identify distortable ink colors in a print job. Again, such distortable ink colors interact with one another when printed in the same printing pass on the same area of a sheet (e.g., by mixing irregularly when wet). More specifically, the controller is adapted to evaluate the print job to identify locations in the print job where the distortable ink colors print on the same area of the sheet in a single-pass printing process.

The controller is also adapted to control the dryer and the sheet feeders to dry the ink printed on the sheets of media between the different print passes. The dryer can be adapted to apply relatively more drying to sheets printed in a single pass and relatively less drying per pass to sheets printed in multiple passes.

In order to address issues with distortable ink colors, the controller is adapted to control the printhead and the sheet feeders to separately print the distortable ink colors in different print passes. While the controller can be adapted to print a single color in each printing pass, the controller can also be adapted to control the printhead and the sheet feeders to separately print sets of different ink colors in different print passes or to print at least two different ink colors in at least one of the printing passes.

In some embodiments, the controller can be adapted to control the printhead to print heat-activated alignment marks in a first pass of the different print passes. The heat-activated alignment marks become temporarily visible after being activated by the dryer. The controller is adapted to control the sheet feeders to align the sheets of media in the different print passes occurring after the first pass using the heat-activated alignment marks while the heat-activated alignment marks are still visible after activation of the heat-activated alignment marks by the dryer (when the dryer dries the sheets of media between the different print passes).

These and other features are described in, or are apparent from, the following detailed description.

BRIEF DESCRIPTION OF THE DRAWINGS

Various exemplary systems and methods are described in detail below, with reference to the attached drawings, in which.

DETAILED DESCRIPTION

As mentioned above, image graininess (more specifically overlay graininess and multi-color graininess) remains a fundamental inkjet issue that cannot be comprehensively addressed using special types of inks or printheads. One cause of graininess is wet-on-wet drop interaction under shear and this cause can be further exacerbated on non-absorbent medias (offset coated glossy stock).

In order to address such issues, the systems and methods herein independently print and dry a subset of ink colors prior to adding the remaining colors. More specifically, these systems and methods allow the image to be created using multiple passes where a subset of colors is laid down and dried prior to the application of the next subset(s) of colors and eventual final drying. The separation of ink laydown significantly improves image smoothness, without using a primer to negate ink-ink interaction.

In more detail, the first subset of colors is printed and the sheet is sent through the full production dryer system, but potentially at reduced power. The drying can be reduced for the initial subset(s) because the full complement of ink has not been deposited and full drying is not needed. The sheet is then sent through the return path where it is re-registered using temporarily visible heat-activated printed targets and then passed to the print stations for the addition of the next subset(s) of colors.

The systems and methods herein can include a low resolution printhead upstream of the color printheads. The low resolution printhead is adapted to print fiducials (registration or alignment marks) using thermochromic ink, which is temporarily activated when the media passes through the dryer.

The image registration is accomplished by aligning the second pass(es) to the fiducials that were printed on the sheet prior to (or with) the first subset color print pass. The fiducials printed with thermochromic ink are activated at the elevated temperatures caused by the media passing through the dryer, which changes the color of the fiducials to allow the fiducials to be temporarily visible. Upon completion of printing and subsequent cooling of media to ambient temperature, the fiducials return to being invisible on the print (return to being the same color as the print media). The fiducials can be printed in the leading-edge margin or can be part of the image at the leading edge. These thermally activated fiducials are then detected by the inboard/outboard sensor prior to registration on the second pass(es) where the target locations are determined, and the sheet is registered to the previous image.

Figure 1:
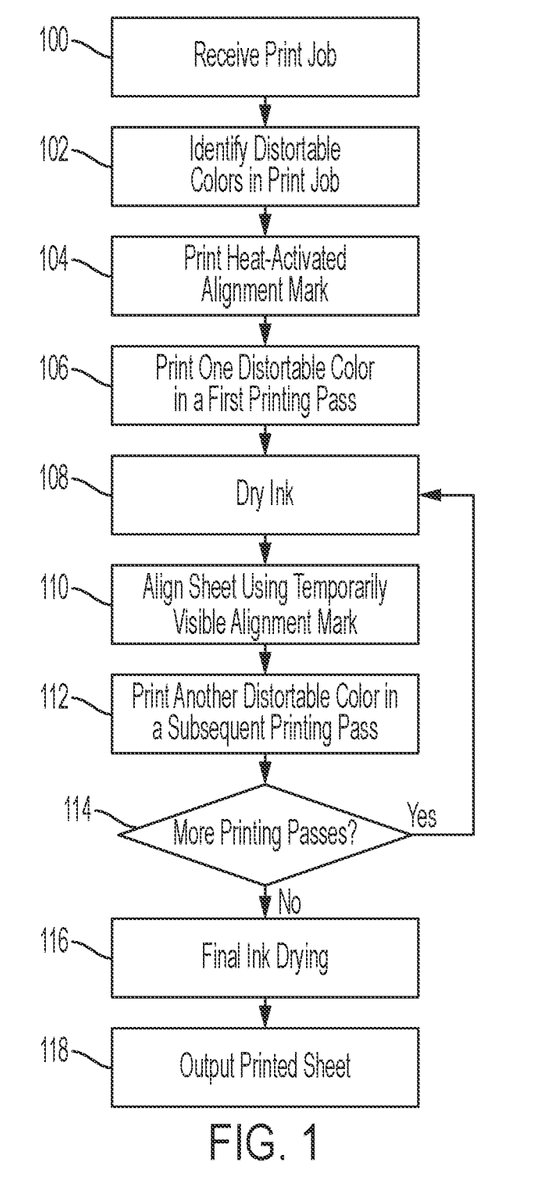
FIG. 1 is a flow diagram of various methods herein.

FIG. 1 is flowchart illustrating exemplary methods herein. In item 100, these methods receive a print job. In item 102, methods herein identify distortable ink colors in a print job. The distortable ink colors are those that interact with one another when printed in the same printing pass on the same area of a sheet (e.g., by mixing irregularly when wet, etc.). Empirical testing can determine inks that interact when different media types are used and such information can be maintained in a lookup table for easy reference. This is especially useful when inks or types of media are changed frequently. A processor of the printer can automatically use such a lookup table to identify the distortable colors in item 102 once the media type and ink types are selected.

Figure 2:
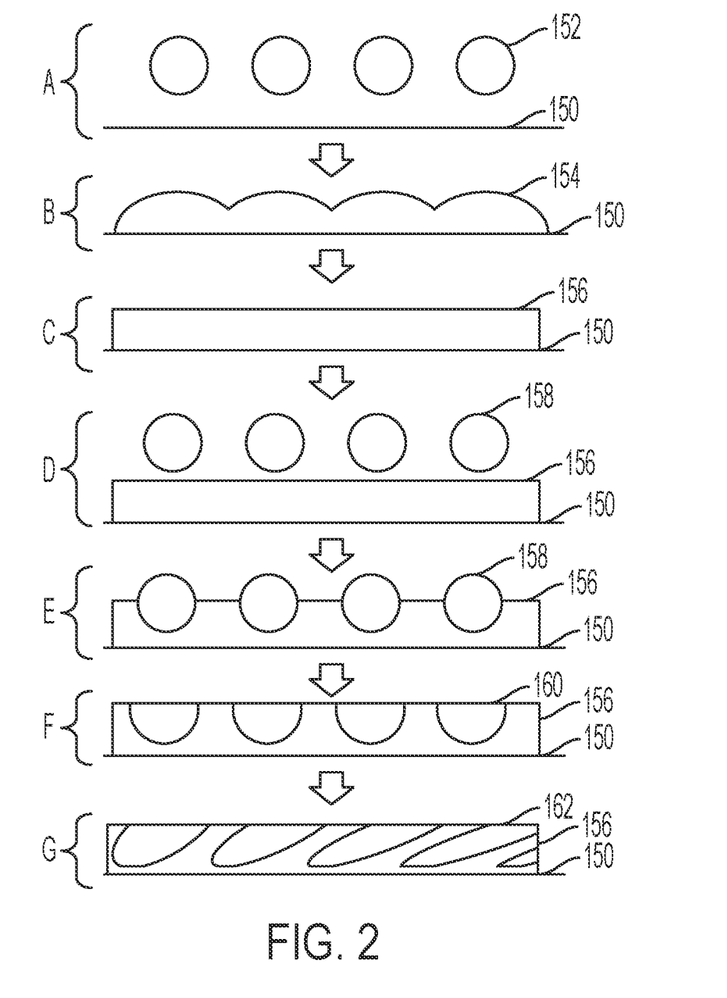
FIG. 2 is a conceptual diagram illustrating distortable inks interacting with one another according to systems and methods herein.

For example, FIG. 2 is a conceptual illustration that shows how different ink colors can interact, which results in grainy images. Specifically, item 150 is a sheet of media (e.g., non-absorbent glossy print media). Section A of FIG. 2 illustrates items 152 that are first ink color droplets ejected from an inkjet printhead toward the sheet of media 150. In section B of FIG. 2, items 154 show the first ink color droplets 152 beginning to merge together as a continuous liquid ink material 154 on the print media 150. In section C of FIG. 2, item 156 is a first ink color layer resulting from the droplets 152 after the continuous ink material 154 has fully merged together. Note that the first color ink layer 156 is not absorbed by the sheet of media 150 but, instead, the first color ink layer 156 remains in a liquid (aqueous state) resting on the sheet of media 150. The first color ink layer 156 may be relatively slower drying and/or lower viscosity, which limits how quickly the first color ink layer moves toward a higher viscosity or semi-solid state. In addition, the relatively lower absorption capability of the glossy print media prolongs the solidification of the first color ink layer.

In section D of FIG. 2, items 158 are second ink color droplets ejected from the inkjet printhead toward the sheet of media 150. While the drawings are greyscale, the second ink color droplets 158 are a different color from the first ink color droplets 152. For example, the first ink color droplets 152 could be yellow, while the second ink color droplets 158 could be magenta. The present inventors have identified many different distortable pairs of ink colors where, for example, some yellow and magenta inks interact and distort if they are printed together in the same print pass and are not separated by drying cycle.

Section E of FIG. 2 shows that the second ink color droplets 158 initially travel into the first color ink layer 156 because, as noted above, the first color ink layer 156 remains liquid a relatively longer time than some other inks. Section F of FIG. 2 shows that, eventually, the second ink color droplets 158 will change shape into second ink color partial droplets 160 positioned within the (still aqueous) first color ink layer 156 and the second ink color partial droplets 160 form a continuous upper surface with the upper surface of the layer of the first ink color 156.

If the first and second ink colors stay in their relative positions to one another and solidify (dry), the final printed product would have the appearance shown in section F of FIG. 2, which would result in relatively higher image quality with little graininess. For example, if the first ink color is a relatively faster drying ink, the layer of the first ink color 156 may become a solid or semi-solid (e.g., gel or become a thicker (higher viscosity) liquid) as the second ink color droplets 158 reach the first color ink layer 156 and the two would maintain their relative positions. Alternatively, if the second ink color is a relatively faster drying ink, the second ink color droplets 158 may become a solid or semi-solid as the second ink color droplets 158 reach the first color ink layer 156. Either situation can allow the first and second ink colors to stay in their relative positions to one another as shown in section F of FIG. 2.

Thus, if the first and second ink colors stay in their relative position to one another as shown in section F of FIG. 2, the final printed product would have the appearance shown in section F of FIG. 2, which again would result in relatively higher image quality with little graininess. However, if both the first and second ink colors are relatively slower drying inks, both may be relatively lower viscosity fluids as they move from the printhead to the dryer and the first and second inks can interact, mix, or blend inconsistently as a consequence of movement or spreader application, resulting in visual blurring or mixing of the inks as shown in section G of FIG. 2.

The mixed inks shown in section G of FIG. 2 will not have the same spacing between dots or the same consistent dot shapes and sizes as shown in section F of FIG. 2 and this will result in relatively lower image quality with relatively higher graininess. The systems and methods herein print such distortable inks in different passes, allowing one ink to dry before application of the other ink, to maintain the reduced graininess and higher image quality position of the dots (pixels) shown in section F of FIG. 2.

Figure 3:
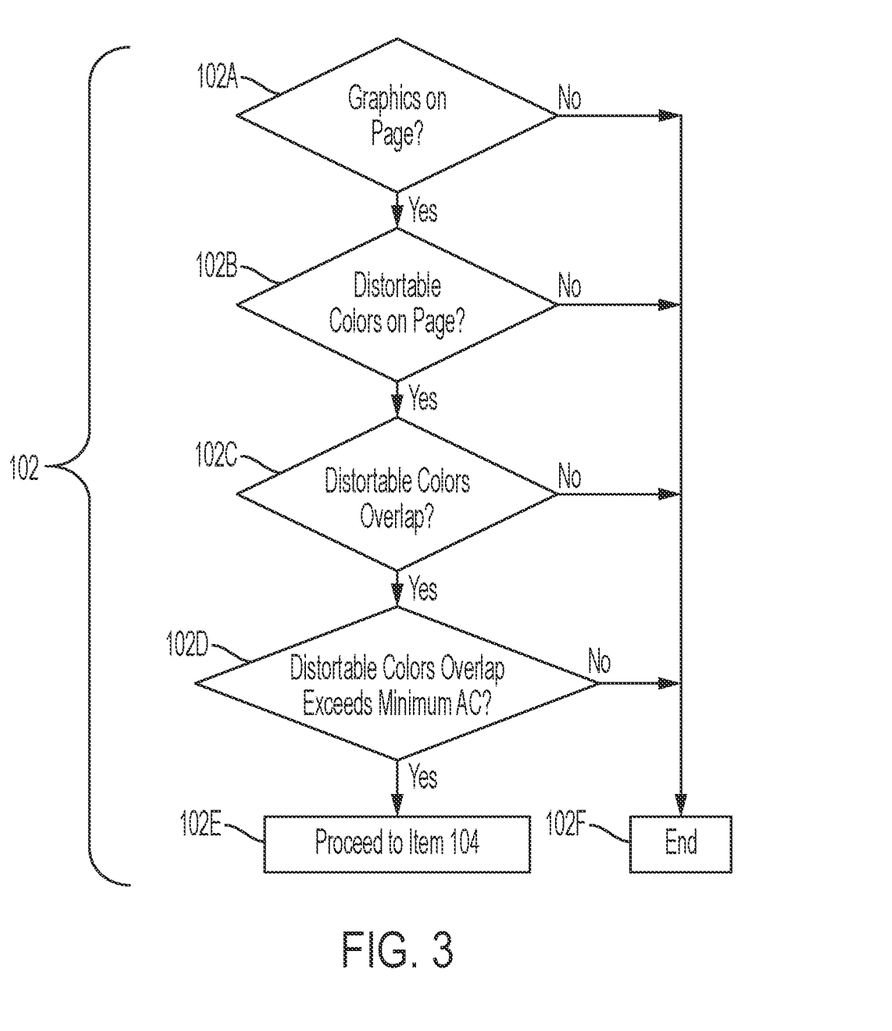
FIG. 3 is a flow diagram of various methods herein.

More specifically, in item 102 these processes evaluate the print job to identify locations in the print job where the distortable ink colors would print on the same area of the same sheet in a single-pass printing process. The processing in item 102 is shown in more detail in the sub-flowchart shown in FIG. 3. All or some of the steps shown in FIG. 3 are optional. Therefore, in one option, the processing shown in FIG. 3 can be omitted and the operator can set the printer to a specific mode (e.g., high-quality mode) during which the printer performs multi-pass printing on every sheet in the print job, requiring the processing shown in FIG. 1 to be performed on every sheet.

Performing multi-pass printing on every sheet in the print job slows the printing process and decreases throughput and productivity. Performing some or all of the processing shown in FIG. 3 can reduce the number of sheets subjected to the multi-pass printing process shown in FIG. 1. For example, as shown in item 102A in FIG. 3, this processing can determine whether there are graphic items on a page. Text or other non-graphic items do not suffer significantly in user perception from graininess which can allow pages of a print job that do not contain graphics to be printed in a single pass without affecting perceived image quality. Therefore, if there are not graphics on a given page in the print job, the processing shown in FIG. 1 can be avoided and the process can end as shown in item 102F.

However, if there are graphics, the processing in item 102B is performed to determine whether any of the differently colored inks interact with one another to cause distortion. As noted above, some types of cyan and magenta inks mix irregularly when printed with 4-color cyan, yellow, magenta, black (CMYK) printers. Thus, if cyan and magenta appear anywhere on a given page of the print job, processing proceeds to item 102C; otherwise processing ends 102F.

In item 102C, these processes determine whether the distortable colors actually print on the same area of a page. If the distortable colors do not print on the same area of a page, processing can end 102F. If the distortable colors print on the same area of a page, processing proceeds to item 102D where the amount of printing overlap is calculated.

Specifically, in item 102D, this processing determines the amount of area coverage (AC) the distortable colors share. Thus, if the printing density (area coverage, which can be measured in pixel counts, percentages, etc.) of one or both of the distortable colors exceeds a previously established minimum (potentially established by empirical testing, etc.) for a previously established minimum overlap area (which can be measured in distance (e.g., mm, etc.) or pixel counts), the processing in item 102D moves to item 102E where the processing shown in FIG. 1 proceeds to item 104. Otherwise, processing ends 102F.

Therefore, item 102D checks whether overlapping distortable colors overlap enough to warrant the productivity cost of multi-pass printing a page. To do this, item 102D checks to see if the printing density of each of the distortable colors is high enough in the overlap area and 102D also checks to see if the overlap area is large enough. If the density of printing is not high enough in the overlap area or if the overlap area is very small, any distortion caused by the overlap may not be easily noticeable and processing can end at 102F to save the productivity hit of multi-pass printing.

In one way the sub-processing shown in FIG. 3 explains that simply the presence of a distortable color ink and corresponding print media in a print job may not always mandate multi-pass printing. Instead, in some implementations, two distortable color inks must be printed on the same area of a sheet for that sheet to be subjected to multi-pass printing. In some implementations, that area must be large enough to be noticeable. Further, the density of one, or both, of the distortable color inks must be high enough to result in noticeable distortion. In this way, the methods and systems herein can automatically determine which sheets (if any) of a print job need to be subjected to multi-pass printing to limit the productivity losses that are associated with multi-pass printing to only those situations where image quality gains are produced by the multi-pass printing.

Referring back to FIG. 1, if the sub-processing shown in FIG. 3 determines the multi-pass printing to be worthwhile, the methods herein control the printhead and sheet feeders of a printing apparatus to separately print the distortable ink colors in different print passes (in items 104-112). While each printing pass can print a single color, some methods herein control the printhead and the sheet feeders to separately print sets of different ink colors in different print passes or to print at least two different ink colors in at least one of the printing passes.

More specifically, in item 104 these methods can use a dedicated printhead to print heat-activated registration/alignment marks (thermochromic fiducials) prior to, or during, the first printing pass. The ink used to print the heat-activated alignment marks is a special type of ink (thermochromic ink) that is the same color as the sheet of print media at room temperatures but becomes a different color at temperatures above room temperatures. Therefore, the thermochromic ink is only visible on the sheets of media (e.g., only a different color from the sheets of media) at elevated temperatures.

For example, thermochromic inks are temperature sensitive compounds that temporarily change color with exposure to heat. Thermochromic inks are generally in two forms, liquid crystals and leuco dyes. Virtually all inorganic compounds are thermochromic to some extent. For example, titanium dioxide, zinc sulfide, and zinc oxide are white at room temperature (potentially matching the color of the print media) but when heated change to yellow, which provides sufficient visibility to be used as a fiducial or alignment mark.

The type of thermochromic ink selected can vary and is selected to match the color of the print media in the range of expected room or environment temperatures (e.g., 0-40° C.). But when the temperature rises above room temperature (e.g., above 40° C.) the thermochromic ink is selected to change color to be distinct enough to be detected by an alignment mark detector (e.g., optical sensor). Different thermochromic inks will be useful with different color print media and with different dryers used by different printers.

In item 106, the methods herein control the printhead and sheet feeders to print one of the distortable colors in a first printing pass. This first printing pass in item 106 can print multiple colors so long as distortable colors are not printed in the same pass. Therefore, in a four-color system with two distortable colors, two or three colors may be printed in one printing pass while the other color(s) are printed in another printing pass.

These methods further control the sheet feeders and a dryer of the printing apparatus to dry the ink printed on the sheets of media between the different print passes, as shown in item 108. For example, the dryer can be a resistive dryer, a microwave dryer, using convection or conduction, etc., that increases the temperature of the ink printed on the sheet of media. In such processing such methods can control the dryer to apply relatively more drying to sheets printed in a single pass and relatively less drying per pass to sheets printed in multiple passes.

Figure 4:
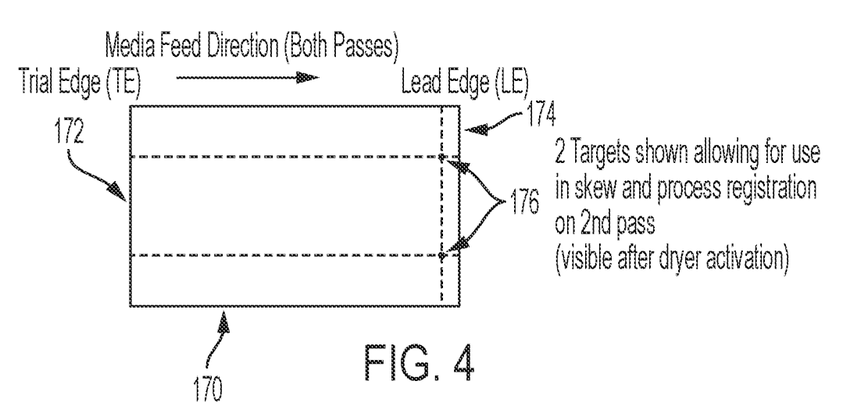
FIG. 4 is a conceptual diagram illustrating alignment marks created by systems and methods herein.

The heat-activated alignment marks become temporarily visible after being activated (heated) by the dryer and while they remain at elevated temperatures. This is shown, for example in FIG. 4, which illustrates heat-activated alignment marks 176. More specifically, FIG. 4 illustrates a sheet of media 170 having a trailing edge (TE) 172, a leading edge (LE) 174, and targets or heat-activated alignment marks 176. The media feed direction (for both passes) feeds the leading edge 174 to printing elements before the trailing edge 172 reaches such printing elements. The two targets 176 allow for use in skew and process direction registration (shown by the broken lines on the sheet of media 170) on the second pass, and the targets 176 are only visible after dryer activation and while the sheet 170 is at an elevated temperature.

Referring again to FIG. 1, in item 110, these methods can control the sheet feeders use the temporarily visible heat-activated alignment marks to align the sheets of media before performing printing in passes that occur after the first printing pass. Thus, in item 110, the heat-activated alignment marks are only used while the heat-activated alignment marks are visible (after activation of the heat-activated alignment marks by the dryer when the dryer dries the sheets of media between the different print passes).

In item 112, the methods herein control the printhead and sheet feeders to print another one of the distortable colors in at least one additional (e.g., second, third, etc.) printing pass. This additional printing pass(es) in item 112 can also print multiple colors so long as distortable colors are not printed in the same pass. When printing in multiple print passes, the sheets can be interleaved. In this interleaving process, some sheets receive a first printing pass while other sheets are returning to the printhead for a subsequent printing pass, causing sheets receiving a first pass of printing and sheets receiving a subsequent pass of printing to be supplied alternately to the printhead (interleaved) for throughput gains.

Item 114 repeats the additional print passes so long as additional print passes are left for printing. Therefore, this process repeats to allow all distortable colors to be printed in a separate printing pass. In one example, if three or more colors of a print job interact, each of those distortable colors can be printed in a separate printing pass.

If there are no further print passes to be printed, a final ink drying step can be performed in item 116. As noted above, the drying 108 that occurs between print passes may be at a reduced energy or lower temperature than the final drying 116. The printed sheets are then output as shown in item 118.

Figure 5:
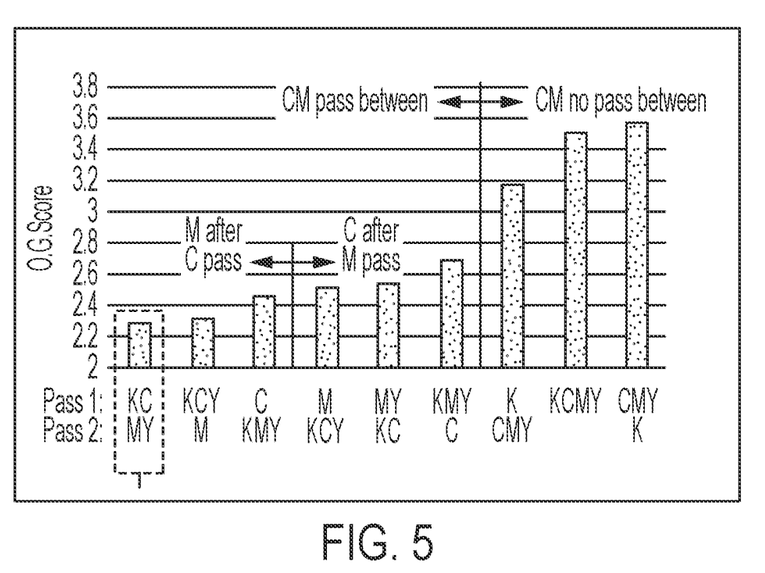
FIG. 5 is a graph showing how systems and methods herein identify and compensate for distortable colors.

As noted above, empirical testing can determine inks that interact when different media types are used and such information can be maintained in a lookup table for easy reference, and a processor of the printer can automatically use such a lookup table to identify the distortable colors in item 102. FIG. 5 illustrates one non-limiting example of results of empirical testing with a four-color system (CMYK) applied to a highly glossy and low absorbing print media. In FIG. 5, the vertical axis is an O.G. (overlay graininess) Score based on how much graininess is observed. The horizontal axis are different color combinations in different print passes.

FIG. 5 demonstrates that (for the specific combination of ink types and media type used) if magenta (M) and cyan (C) are printed in different printing passes, the O.G. Score is reduced, meaning that image quality is improved. Further, FIG. 5 demonstrates that printing magenta in a printing pass after printing cyan increases quality the most. More specifically, moving from left to right along the horizontal axis in FIG. 5, the first three results print cyan in the first printing pass (Pass 1) and magenta in the second printing pass (Pass 2). The second and third results print magenta and cyan alone in their own printing pass, but such color distribution among different printing passes decreases image quality relative to printing black and cyan (KC) in the first pass and magenta and yellow (MY) in the second pass (shown to the far left in FIG. 5).

Continuing to move from left to right in FIG. 5, the next three results print a cyan printing pass after a magenta printing pass and, while the result that prints magenta alone in the first pass and the remainder of the colors in the second pass is the best image quality result of this set of three results, the second three results are all inferior to the image quality of the first three results show to their left. Finally, the far right 3 results keep cyan and magenta in the same pass during each empirical test, with dramatically worse image quality when compared to the six results to their left.

Therefore, FIG. 5 demonstrates that (for a specific exemplary combination of ink types, media type, and printer type, to which the embodiments herein are not specifically limited) if magenta is printed in a subsequent printing pass after printing cyan in a previous printing pass, quality is increased the most. Again, this is only an example, and the specific inks, media, and printer may change the optimization of which inks are separated and the printing pass order.

Thus, this processing not only determines which distortable colors should be printed in separate passes to avoid graininess, it also determines the optimal order in which the distortable colors should be printed in the different passes to produce the highest image quality images on certain pages. Further, this characterization is not just ink dependent and printer dependent, but also considers the adsorptive characteristics of the print media because higher media adsorption helps maintain the positions of distortable inks, which can help reduce smearing that can cause graininess to the point that multi-pass printing may not be required with some higher absorption media types. The information regarding ink distortion resulting from various ink types, printer types, media types, etc., is saved in a lookup table so that whenever a specific combination of media type and ink type is used by a specific printer, the processor of that printer can automatically identify within the print job any distortable colors (item 102, FIG. 1) that should be printed in separate print passes and the order in which such print passes should occur.

Thus, as shown above, these embodiments separate the printing process into printing multiple subsets of differently colored inks. These separate and complete jetting/drying processes reduce overlay graininess. This allows the inks to be printed in a specified order for improved image quality and also allows flexibility in placement of the colors and inkjet bar locations. Such a multi-pass system allows for variably and choice of ink deposition order to improve image quality without having to physically arrange inkjet bars.

Further, with these embodiments, a low resolution printhead can be positioned upstream of the standard, relatively higher resolution, printheads. The low resolution printhead uses a thermochromic ink appropriate for the given print media to produce a small pixel count and this keeps the targets small, and as background or invisible alignment marks at room temperature. The thermochromic ink is selectively activated only when the media passes through the dryer, which allows the fiducials to be visible to the registration system while at elevated temperature during second pass, but not visible to the customer after cooling to room temperature.

The methods and systems herein can selectively perform multi-pass printing for high quality printing, while still allowing for high throughput lower quality or transaction work. Similarly, the dryer is adapted to reduce heating for lesser amounts of ink deposited in the separate printing passes for time and energy savings. The lower temperature drying allows for printing on media susceptible to temperature degradation (e.g., multi-layer polymer and adhesive stocks of media). In addition, interleaved inkjet prints can be used to improve throughput when multiple print passes are performed.

Thus, the methods and systems herein improve printing on coated stock media without the need for ink matched jetted/printed primer coatings, which reduces the need to use pre-coated inkjet stocks and associated costs.

Figure 6:
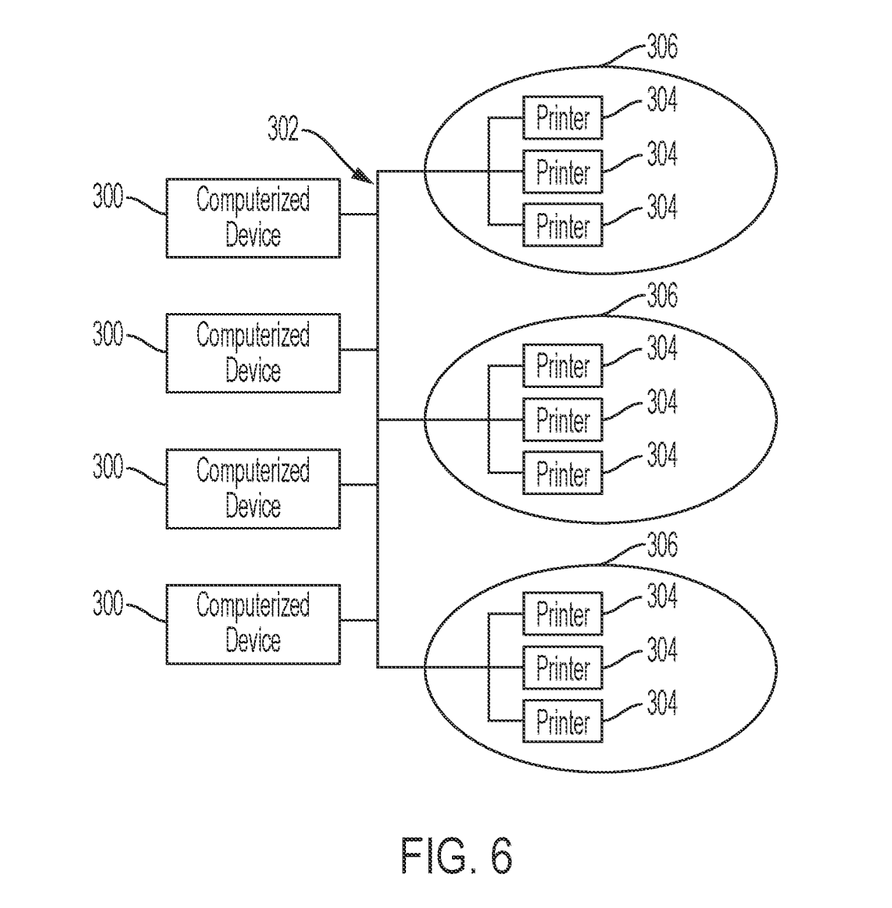
FIG. 6 is a schematic diagram illustrating systems herein.

As shown in FIG. 6, exemplary systems and methods herein include various computerized devices 300, 304 located at various different physical locations 306. The computerized devices 300, 304 can include print servers, printing devices, personal computers, etc., and are in communication (operatively connected to one another) by way of a local or wide area (wired or wireless) network 302. Any of the shown devices can control printing device elements to perform the processing shown in FIG. 1.

Figure 7:
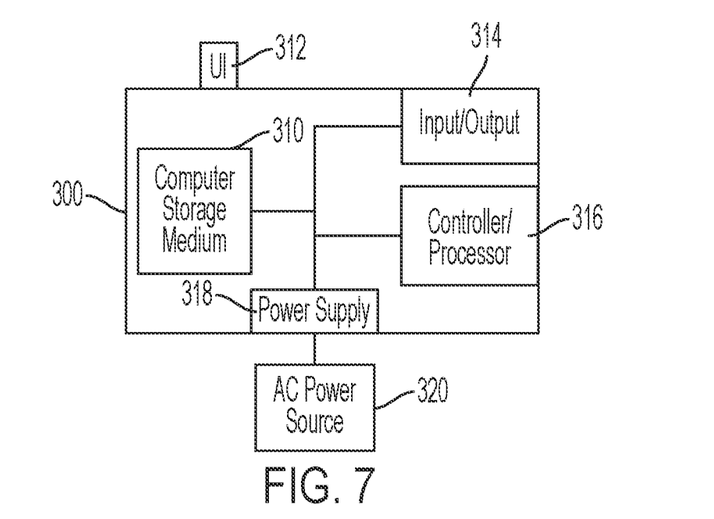
FIG. 7 is a schematic diagram illustrating computerized devices herein.

FIG. 7 illustrates a computerized device 300, which can be used with systems and methods herein and can comprise, for example, a print server, a personal computer, a portable computing device, etc. The computerized device 300 includes a controller/tangible processor 316 and a communications port (input/output) 314 operatively connected to the tangible processor 316 and to the computerized network 302 external to the computerized device 300. Also, the computerized device 300 can include at least one accessory functional component, such as a user interface (UI) assembly 312. The user may receive messages, instructions, and menu options from, and enter instructions through, the user interface or control panel 312.

The input/output device 314 is used for communications to and from the computerized device 300 and comprises a wired device or wireless device (of any form, whether currently known or developed in the future). The tangible processor 316 controls the various actions of the computerized device. A non-transitory, tangible, computer storage medium device 310 (which can be optical, magnetic, capacitor based, etc., and is different from a transitory signal) is readable by the tangible processor 316 and stores instructions that the tangible processor 316 executes to allow the computerized device to perform its various functions, such as those described herein. Thus, as shown in FIG. 7, a body housing has one or more functional components that operate on power supplied from an alternating current (AC) source 320 by the power supply 318. The power supply 318 can comprise a common power conversion unit, power storage element (e.g., a battery, etc), etc.

Figure 8:
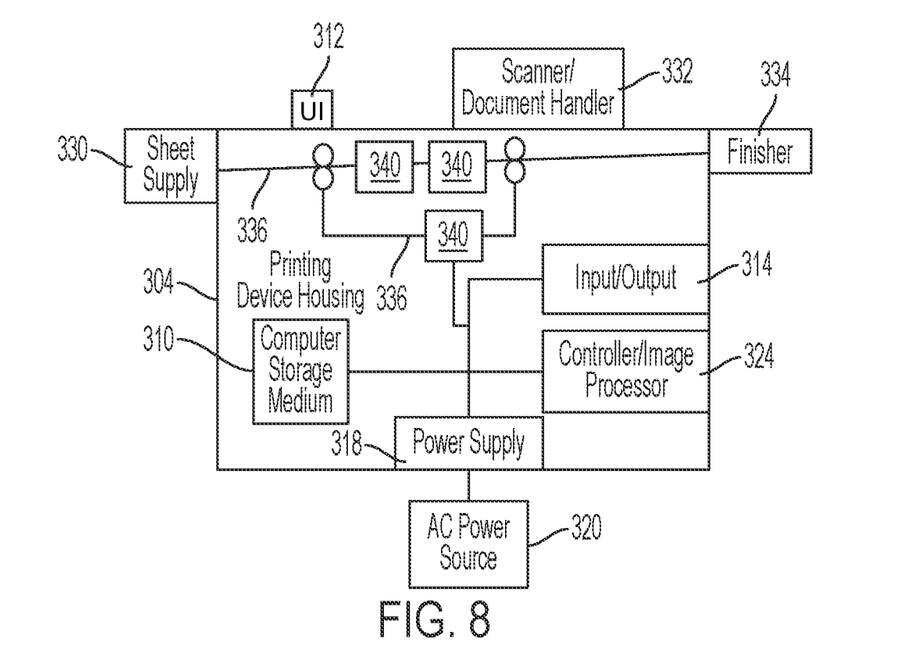
FIGS. 8-11 are schematic diagrams illustrating printing devices herein.

FIG. 8 illustrates a computerized device that is a printing device 304, which can be used with systems and methods herein and can comprise, for example, a printer, copier, multi-function machine, multi-function device (MFD), etc. The printing device 304 includes many of the components mentioned above and at least one marking device (printing engine(s)) 340 operatively connected to a specialized image processor 324 (that is different from a general purpose computer because it is specialized for processing image data), a media path 336 positioned to supply continuous media or sheets of media from a sheet supply 330 to the marking device(s) 340, etc. After receiving various markings from the printing engine(s) 340, the sheets of media can optionally pass to a finisher 334 which can fold, staple, sort, etc., the various printed sheets. Also, the printing device 304 can include at least one accessory functional component (such as a scanner/document handler 332 (automatic document feeder (ADF)), etc.) that also operate on the power supplied from the external power source 320 (through the power supply 318).

Figure 10:
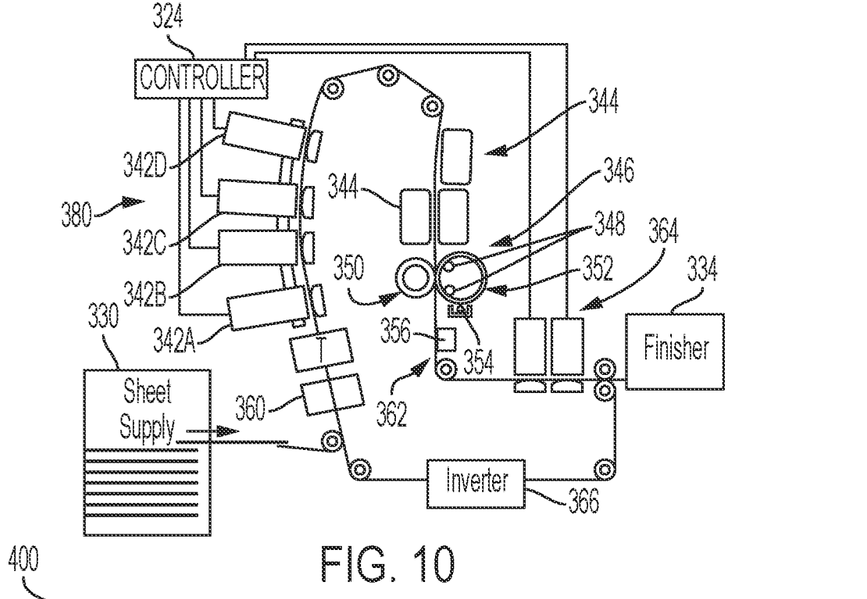
Figure 11:
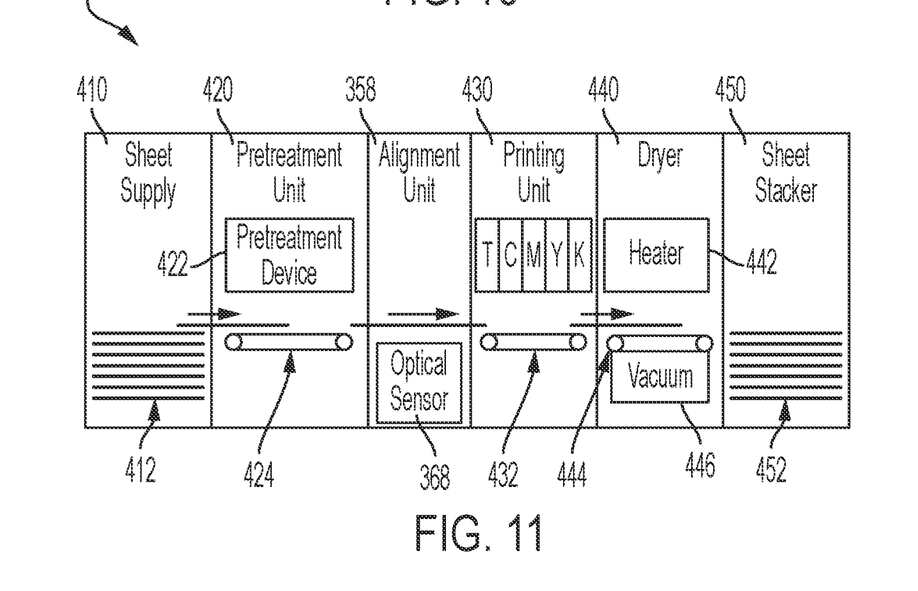

The one or more printing engines 340 are intended to illustrate any marking device that applies a marking material (toner, inks, etc.) to continuous media or sheets of media, whether currently known or developed in the future and can include, for example, devices that use an ink jet imaging system, as shown in FIG. 10, or a high-speed aqueous imaging system, as shown in FIG. 11.

Figure 9:
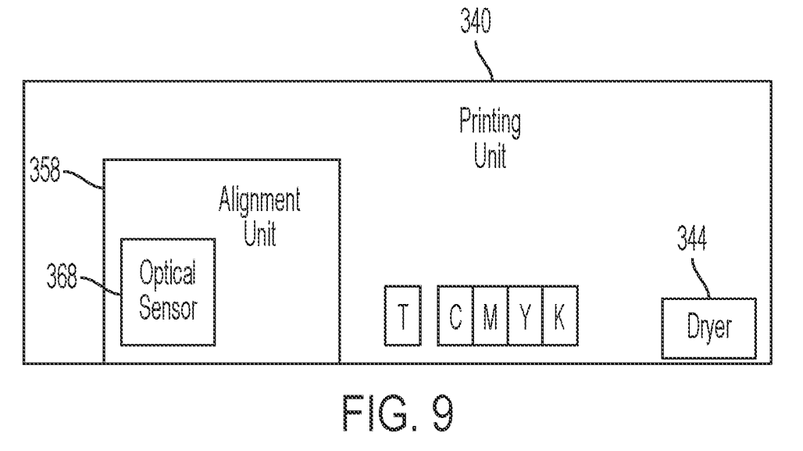

FIG. 9 shows some elements of some embodiments of these printing engines 340. As shown in FIG. 9, the printing engines 340 can include an alignment (registration) unit 358 adapted to perform skew and process registration. The alignment unit 358 has an optical sensor 368 adapted to identify the heat-activated alignment marks after they have been activated by the dryer and while the alignment marks are still at an elevated temperature and are still a different color from the sheet of media. Thus, a dryer 344 can be included in the printing engines 340.

FIG. 9 also shows printing elements (in this example separate units for each color cyan, magenta, yellow, and black (CMYK) although any color units could be used) and a low-resolution thermochromic printhead T that is adapted to print the heat-activated alignment marks. The thermochromic printhead T can be lower resolution relative to the other relatively higher-resolution printheads CMYK to reduce costs and to save space within the device.

As shown in FIG. 9, the thermochromic printhead T can be positioned before the other printheads (in the process direction) so that the heat-activated alignment marks can be printed during the first pass and before the other marks are printed in the first pass. In other implementations, the thermochromic printhead T can be positioned after the other printheads (in the process direction) so that the heat-activated alignment marks can be printed during the first pass but after the other marks are printed in the first pass. In yet other alternatives the thermochromic printhead T can be a component of a separate device and, in one example, the sheets of media may be supplied to any of the printing devices described herein with the heat-activated alignment marks already in place (potentially printed thereon by the media supplier or manufacturer).

Systems herein perform such methods using the printhead T-CMYK, the dryer 344 adapted to dry the ink printed on sheets of media by the printhead T-CMYK, sheet feeders 336 adapted to move the sheets of media to and from the printhead T-CMYK and the dryer 344, a controller 324 adapted to control the printhead T-CMYK, the dryer 344, and the sheet feeders 336, and other components. The controller 324 is adapted to identify distortable ink colors in a print job. Again, such distortable ink colors interact with one another when printed in the same printing pass on the same area of a sheet (e.g., by mixing irregularly when wet). More specifically, the controller 324 is adapted to evaluate the print job to identify locations in the print job where the distortable ink colors print on the same area of the sheet in a single-pass printing process.

The controller 324 is also adapted to control the dryer 344 and the sheet feeders 336 to dry the ink printed on the sheets of media between the different print passes. The dryer 344 can be adapted to apply relatively more drying to sheets printed in a single pass and relatively less drying per pass to sheets printed in multiple passes.

In order to address issues with distortable ink colors, the controller 324 is adapted to control the printhead T-CMYK and the sheet feeders 336 to separately print the distortable ink colors in different print passes. While the controller 324 can be adapted to print a single color in each printing pass, the controller 324 can also be adapted to control the printhead T-CMYK and the sheet feeders 336 to separately print sets of different ink colors in different print passes or to print at least two different ink colors in at least one of the printing passes.

In some embodiments, the controller 324 can be adapted to control the printhead T-CMYK to print heat-activated alignment marks in a first pass of the different print passes. The heat-activated alignment marks become temporarily visible after being activated by the dryer 344. The controller 324 is adapted to control the sheet feeders 336 to align the sheets of media in the different print passes occurring after the first pass using the heat-activated alignment marks while the heat-activated alignment marks are still visible after activation of the heat-activated alignment marks by the dryer 344 (when the dryer 344 dries the sheets of media between the different print passes).

FIG. 10 illustrates one specific example of the above-mentioned printing engine(s) 380 that is an ink jet imaging system. In this example, the imaging apparatus 380 is in the form of an ink jet printer that employs one or more ink jet printheads, each with an associated solid ink supply (342A-342D). The exemplary direct-to-sheet phase-change ink jet imaging system 380 includes a media supply and handling system 330 configured to supply media (e.g., paper, plastic, or other printable material). A media conditioner/registration unit 360 (which can contain the components illustrated in FIG. 9 discussed above), printed sheet conditioner 344, coating station 364, and finisher 334.

The media is propelled by a sheet transport 362 that can include a variety of motors rotating one or more rollers. For multi-pass operations, an inverter 366 may be used to flip the sheet over to present a second side of the media to the printheads 342A-342D or sheets can be left in the same orientation for subsequent passes of multi-pass printing.

The media conditioner 360 includes, for example, a pre-heater, which can further activate the heat-activated alignment marks discussed above. The pre-heater brings the media to an initial predetermined temperature that is selected for desired image characteristics corresponding to the type of media being printed as well as the type, colors, and number of inks being used. The pre-heater may use contact, radiant, conductive, or convective heat to bring the media to a target preheat temperature.

The media is transported through a printing station that includes a series of color printheads 342A-342D, each color unit effectively extending across the width of the media and being able to place ink directly (i.e., without use of an intermediate or offset member) onto the moving media. As is generally familiar, each of the printheads may eject a single color of ink, one for each of the colors typically used in color printing, namely, cyan, magenta, yellow, and black (CMYK) and the low-resolution thermochromic printhead T discussed above. A controller 324 generates timing signals for actuating the ink jet ejectors in the printheads 342A-342D in synchronization with the passage of the media to enable the four colors to be ejected with a reliable degree of accuracy for registration of the differently colored patterns to form four primary-color images on the media. The ink jet ejectors are actuated by the firing signals to correspond to image data processed by the controller 324 that may be transmitted to the printer, generated by a scanner (not shown) that is a component of the printer, or otherwise generated and delivered to the printer. In various possible embodiments, a color unit for each primary color may include one or more printheads; multiple printheads in a color unit may be formed into a single row or multiple row array; printheads of a multiple row array may be staggered; a printhead may print more than one color; or the printheads or portions of a color unit may be mounted movably in a direction transverse to the process direction, such as for spot-color applications and the like.

Each of color printheads 342A-342D may include at least one actuator configured to adjust the printheads in each of the printhead modules in the cross-process direction across the media web. In a typical embodiment, each motor is an electromechanical device such as a stepper motor or the like. In a practical embodiment, a print bar actuator is connected to a print bar containing two or more printheads and is configured to reposition the print bar by sliding the print bar along the cross-process axis of the media web. In alternative embodiments, an actuator system may be used that does not physically move the printheads but redirects the image data to different ejectors in each head to change head position.

The printer may use liquid ink or "phase-change ink," by which is meant that the ink is substantially solid at room temperature and substantially liquid when heated to a phase change ink melting temperature for jetting onto the imaging receiving surface. The phase change ink melting temperature may be any temperature that is capable of melting solid phase change ink into liquid or molten form. As used herein, liquid ink refers to melted solid ink, heated gel ink, or other known forms of ink, such as aqueous inks, ink emulsions, ink suspensions, ink solutions, or the like.

Associated with each color unit is a backing member, typically in the form of a bar or roll, which is arranged substantially opposite the color unit on the back side of the media. Each backing member is used to position the media at a predetermined distance from the printheads opposite the backing member. Each backing member may be configured to emit thermal energy to heat the media to a predetermined temperature.

Following the printing zone along the media path are one or more "mid-heaters" 344 or dryer. A mid-heater 344 may use contact, radiant, conductive, and/or convective heat to control a temperature of the media and particularly to bring the media to a temperature suitable for desired properties when passing through the spreader 346. A fixing assembly in the form of the "spreader" 346 is configured to apply heat and/or pressure to the media to fix the images to the media. The function of the spreader 346 is to take what are essentially droplets, strings of droplets, or lines of ink on the sheet and smear them out by pressure and, in some systems, heat, so that spaces between adjacent drops are filled and image solids become uniform. The spreader 346 may include rollers, such as image-side roller 352 and pressure roller 350, to apply heat and pressure to the media, either of which can include heating elements, such as heating elements 348, to bring the media to a predetermined temperature. The spreader 346 may also include a cleaning/oiling station 354 associated with image-side roller 352. The station 354 cleans and/or applies a layer of some release agent or other material to the roller surface. A coating station 364 applies a clear ink to the printed media to modify the gloss and/or to help protect the printed media from smearing or other environmental degradation following removal from the printer.

Operation and control of the various subsystems, components and functions of the imaging system are performed with the aid of the controller 324. The controller 324 may be implemented with general or specialized programmable processors that execute programmed instructions. The controller 324 may be operatively coupled to the print bar and printhead actuators of color printheads 342A-342D in order to adjust the position of the print bars and printheads along the cross-process axis of the media web. In particular, the controller may be operable to shift one or more, or all, of the color units laterally or transverse to the process direction.

The imaging system may also include an optical imaging system 356 that is configured in a manner similar to that for creating the image to be transferred to the web. The optical imaging system is configured to detect, for example, the presence, intensity, and/or location of ink drops jetted onto the receiving member by the ink jets of the printhead assembly. The imaging system may incorporate a variety of light sources capable of illuminating the printed web sufficient to detect printing errors that may be attributable to a faulty or defective ink jet or printhead. The imaging system 356 further includes an array of light detectors or optical sensors that sense the image reflected from the printed web prior to discharge. The controller 324 analyzes the information from the imaging system 356 to determine, among other things, whether a failure or an ink jet or printhead has occurred. The location of the defective printing element is identified and made available to the maintenance technician during a diagnosis procedure. The controller 324 may also use the data obtained from the imaging system 356 to adjust the registration of the color units such as by moving a color unit or one or more printheads. This image data may also be used for color control.

FIG. 11 illustrates an inkjet or aqueous ink printer system 400 that is one of the printers 304, discussed above. Specifically, FIG. 11 illustrates a high-speed ink jet or aqueous ink image producing machine or printer 400. The printer 400 includes a media supply 410, a pretreatment unit 420, an alignment unit 358 having an optical sensor 368, a printing unit 430, a dryer 440, and a sheet stacker 450. The media supply 410 stores a plurality of media sheets 412 for printing by the printer 400.

The pretreatment unit 420 includes at least one pretreatment device 422 and transport belt 424. The pretreatment unit 420 receives the media sheets from the media supply 410 and transports the media sheets in a process direction (block arrows in FIG. 11) through the pretreatment unit 420. The pretreatment device 422 conditions the media sheets and prepares the media sheets for printing in the printing unit 430. The pretreatment unit 420 may include, for example, a coating device that applies a coating to the media sheets, a drying device that dries the media sheets, and/or a heating device that heats the media sheets to a predetermined temperature. In some embodiments, the printer 400 does not include a pretreatment unit 420 and media sheets are fed directly from the media supply 410 to the printing unit 430. In other embodiments, the printer 400 may include more than one pretreatment unit.

The printing unit 430 includes at least one marking unit transport belt 432 that receives the media sheets from the pretreatment unit 420 or the media supply 410 and transports the media sheets through the printing unit 430. The printing unit 430 further includes at least one printhead (labeled T and CMYK in FIG. 11 to represent the thermochromic printhead and the standard cyan, magenta, yellow, and black color printheads; however any color printheads could be used). The printhead (T and CMYK) ejects aqueous ink onto the media sheets as the media sheets are transported through the printing unit 430. In the illustrated embodiment, the printing unit 430 includes four printheads (CMYK), each of which ejects one of cyan, magenta, yellow, and black ink onto the media sheets. The reader should appreciate, however, that other embodiments include other printhead arrangements, which may include more or fewer printheads, arrays of printheads, etc.

The dryer 440 includes a heater 442 and a vacuum drying belt 444 that receives the media sheets from the printing unit 430. A vacuum plenum 446 connects to a vacuum blower or the plumbing that is connected to a vacuum blower at one side in the cross-process direction. The sheet stacker 450 receives and stacks the printed sheets 452. All of the belts 424, 432, and 444 shown are adapted to return partially printed sheets for multi-pass printing, as described above.

While FIGS. 9-11 illustrate four standard marking stations 342, 350 adjacent or in contact with a rotating belt (348, 360), which is useful with systems that mark in four different colors such as, red, green, blue (RGB), and black; or cyan, magenta, yellow, and black (CMYK), as would be understood by those ordinarily skilled in the art, such devices could use a single marking station (e.g., black) or could use any number of marking stations (e.g., 2, 3, 5, 8, 11, etc.).

The print media is then transported by the sheet output transport 336 to output trays or a multi-function finishing station 334 performing different desired actions, such as stapling, hole-punching and C or Z-folding, a modular booklet maker, etc., although those ordinarily skilled in the art would understand that the finisher/output tray 334 could comprise any functional unit.

As would be understood by those ordinarily skilled in the art, the printing devices shown here are only examples and the systems and methods herein are equally applicable to other types of printing devices that may include fewer components or more components. For example, while a limited number of printing engines and paper paths are illustrated, those ordinarily skilled in the art would understand that many more paper paths and additional printing engines could be included within any printing device used with systems and methods herein.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock TX, USA and Apple Computer Co., Cupertino CA, USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, CT, USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

A "pixel" refers to the smallest segment into which an image can be divided. Received pixels of an input image are associated with a color value defined in terms of a color space, such as color, intensity, lightness, brightness, or some mathematical transformation thereof.

Thus, an image input device is any device capable of obtaining color pixel values from a color image. The set of image input devices is intended to encompass a wide variety of devices such as, for example, digital document devices, computer systems, memory and storage devices, networked platforms such as servers and client devices which can obtain pixel values from a source device, and image capture devices. The set of image capture devices includes scanners, cameras, photography equipment, facsimile machines, photo reproduction equipment, digital printing presses, xerographic devices, and the like. A scanner is one image capture device that optically scans images, print media, and the like, and converts the scanned image into a digitized format. Common scanning devices include variations of the flatbed scanner, generally known in the arts, wherein specialized image receptors move beneath a platen and scan the media placed on the platen. Modern digital scanners typically incorporate a charge-coupled device (CCD) or a contact image sensor (CIS) as the image sensing receptor(s). The scanning device produces a signal of the scanned image data. Such a digital signal contains information about pixels such as color value, intensity, and their location within the scanned image.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. Additionally, terms such as "adapted to" mean that a device is specifically designed to have specialized internal or external components that automatically perform a specific operation or function at a specific point in the processing described herein, where such specialized components are physically shaped and positioned to perform the specified operation/function at the processing point indicated herein (potentially without any operator input or action). In the drawings herein, the same identification numeral identifies the same or similar item.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. An apparatus comprising:
a printhead;
sheet feeders adapted to move sheets of media to and from the printhead; and
a controller adapted to control the printhead and the sheet feeders,
wherein the controller is adapted to identify distortable ink colors in a print job,
wherein the distortable ink colors interact with one another when printed in a same printing pass on a same area of a sheet, and
wherein the controller is adapted to control the printhead and sheet feeders to separately print the distortable ink colors in different print passes,
wherein the controller is adapted to control the printhead to print heat-activated alignment marks in a first pass of the different print passes,
wherein the heat-activated alignment marks become temporarily visible after being activated, and
wherein the controller is adapted to control the sheet feeders to align the sheets of media in the different print passes occurring after the first pass using the heat-activated alignment marks while the heat-activated alignment marks are visible after activation.

2. The apparatus according to claim 1, wherein the controller is adapted to evaluate the print job to identify locations in the print job where the distortable ink colors print on the same area of the sheet in a single-pass printing process.

3. The apparatus according to claim 1, further comprising a dryer adapted to dry ink printed on sheets of media by the printhead, wherein the dryer is adapted to apply relatively more drying to sheets printed in a single pass and relatively less drying per pass to sheets printed in multiple passes.

4. The apparatus according to claim 1, wherein the printhead comprises an inkjet printhead.

5. The apparatus according to claim 1, wherein the distortable ink colors interact with one another by mixing irregularly when wet.

6. The apparatus according to claim 1, wherein the controller is further adapted to control the printhead and the sheet feeders to separately print sets of different ink colors in different print passes.

7. The apparatus according to claim 1, wherein the controller is adapted control the printhead and the sheet feeders to print at least two different ink colors in at least one of the different print passes.

8. An apparatus comprising:
a printhead;
a dryer adapted to dry ink printed on sheets of media by the printhead; and
sheet feeders adapted to move the sheets of media to and from the printhead and the dryer; and
a controller adapted to control the printhead, the dryer, and the sheet feeders,
wherein the controller is adapted to identify distortable ink colors in a print job,
wherein the distortable ink colors interact with one another when printed in a same printing pass on a same area of a sheet,
wherein the controller is adapted to control the printhead and the sheet feeders to separately print the distortable ink colors in different print passes, wherein the controller is adapted to control the printhead to print heat-activated alignment marks in a first pass of the different print passes, wherein the controller is adapted to control the dryer and the sheet feeders to dry the ink printed on the sheets of media between the different print passes, wherein the heat-activated alignment marks become temporarily visible after being activated by the dryer, and wherein the controller is adapted to control the sheet feeders to align the sheets of media in the different print passes occurring after the first pass using the heat-activated alignment marks while the heat-activated alignment marks are visible after activation of the heat-activated alignment marks by the dryer when the dryer dries the sheets of media between the different print passes.

9. The apparatus according to claim 8, wherein the controller is adapted to evaluate the print job to identify locations in the print job where the distortable ink colors print on the same area of the sheet in a single-pass printing process.

10. The apparatus according to claim 8, wherein the dryer is adapted to apply relatively more drying to sheets printed in a single pass and relatively less drying per pass to sheets printed in multiple passes.

11. The apparatus according to claim 8, wherein the printhead comprises an inkjet printhead.

12. The apparatus according to claim 8, wherein the distortable ink colors interact with one another by mixing irregularly when wet.

13. The apparatus according to claim 8, wherein the controller is further adapted to control the printhead and the sheet feeders to separately print sets of different ink colors in different print passes.

14. The apparatus according to claim 8, wherein the controller is adapted to control the printhead and the sheet feeders to print at least two different ink colors in at least one of the different print passes.

15. A method comprising:
identifying distortable ink colors in a print job, wherein the distortable ink colors interact with one another when printed in a same printing pass on a same area of a sheet;
controlling a printhead and sheet feeders of a printing apparatus to separately print the distortable ink colors in different print passes;
printing heat-activated alignment marks in a first pass of the different print passes using the printhead;
drying ink printed on sheets of media by the printhead using a dryer between the different print passes, wherein the heat-activated alignment marks become temporarily visible after being activated by the dryer; and
aligning the sheets of media using the sheet feeders in the different print passes occurring after the first pass using the heat-activated alignment marks while the heat-activated alignment marks are visible after activation of the heat-activated alignment marks by the dryer.

16. The method according to claim 15, further comprising evaluating the print job to identify locations in the print job where the distortable ink colors print on the same area of the sheet in a single-pass printing process.

17. The method according to claim 15, further comprising controlling the dryer of the printing apparatus to apply relatively more drying to sheets printed in a single pass and relatively less drying per pass to sheets printed in multiple passes.

18. The method according to claim 15, wherein the distortable ink colors interact with one another by mixing irregularly when wet.

19. The method according to claim 15, further comprising controlling the printhead and the sheet feeders to separately print sets of different ink colors in different print passes.

20. The method according to claim 15, further comprising controlling the printhead and the sheet feeders to print at least two different ink colors in at least one of the different print passes.

* * * * *